May 13, 1958     E. A. HERIDER ET AL     2,834,396
SEAT SUPPORT
Filed March 21, 1955     6 Sheets-Sheet 1
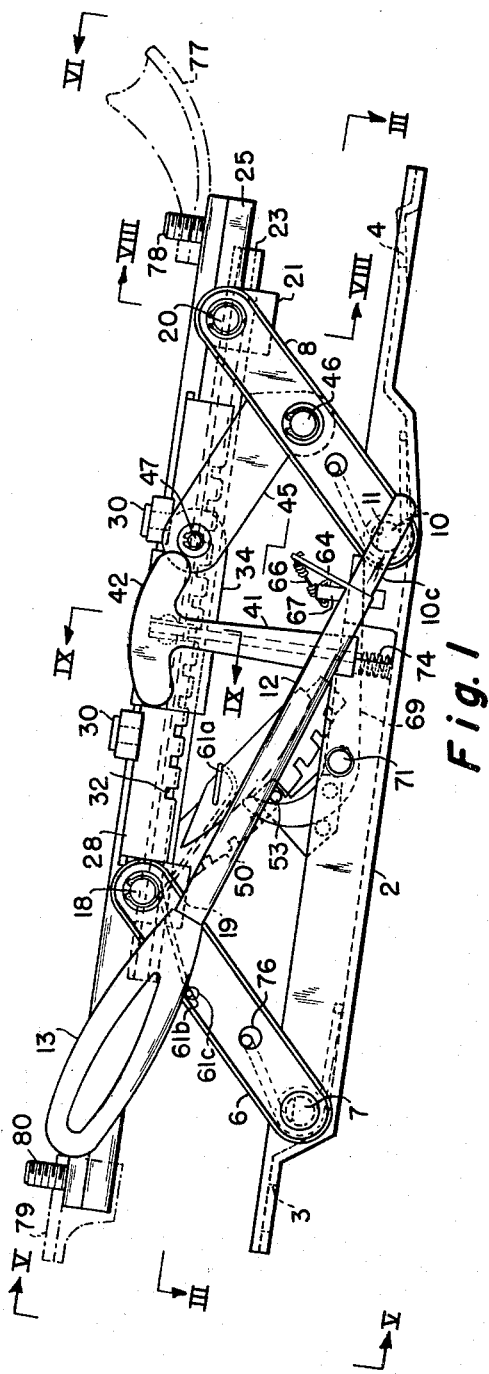
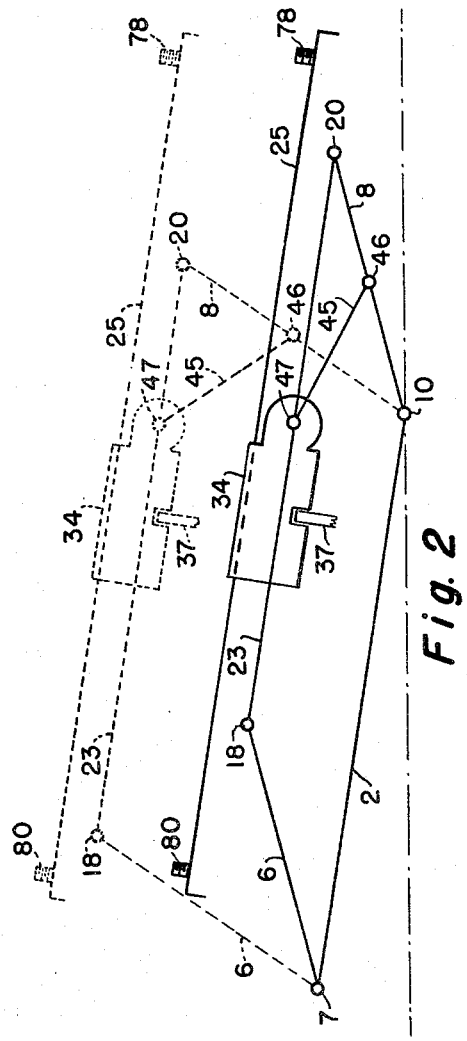
INVENTORS.
Elmer A. Herider
James Cumming
BY
THEIR ATTORNEYS

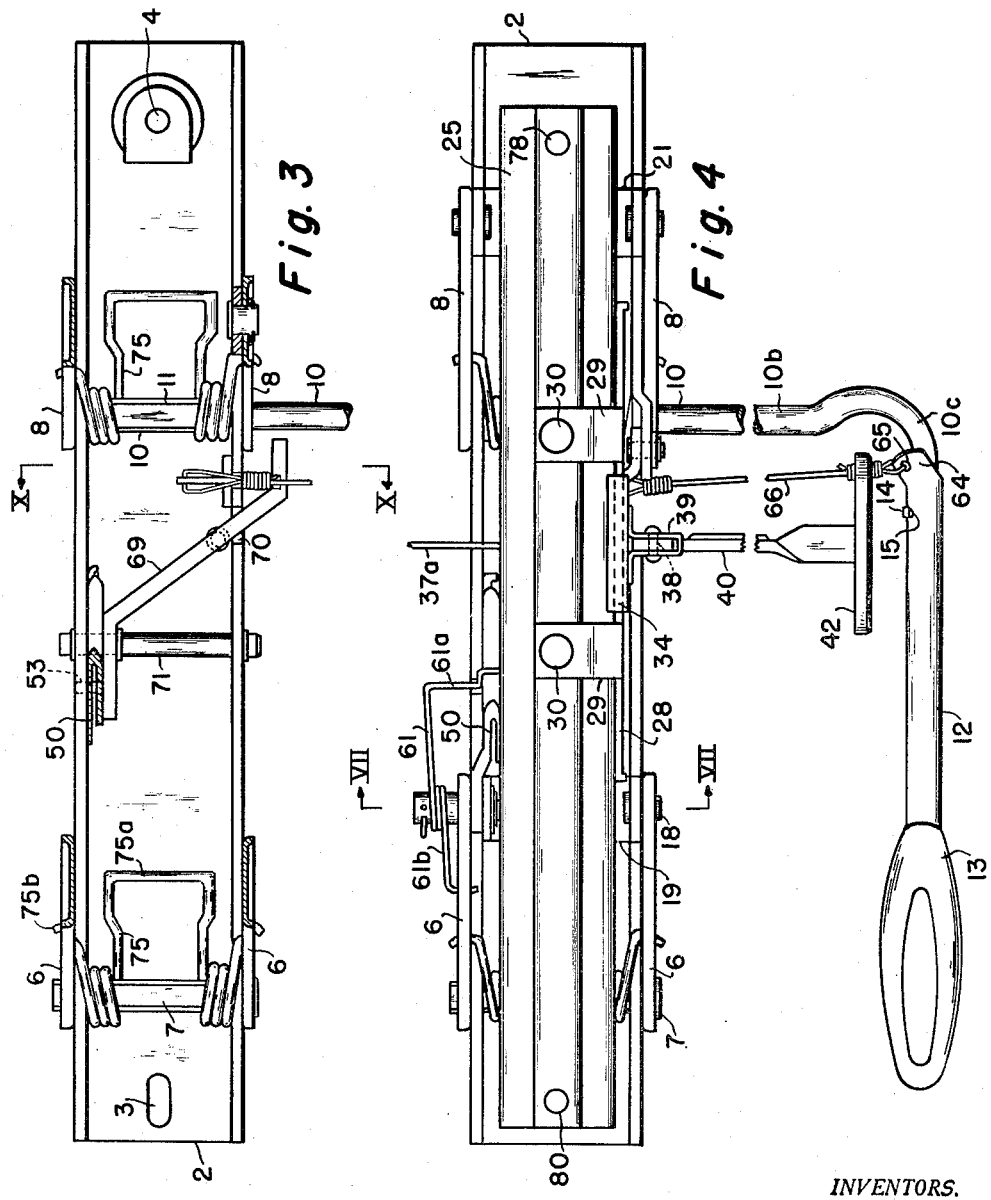

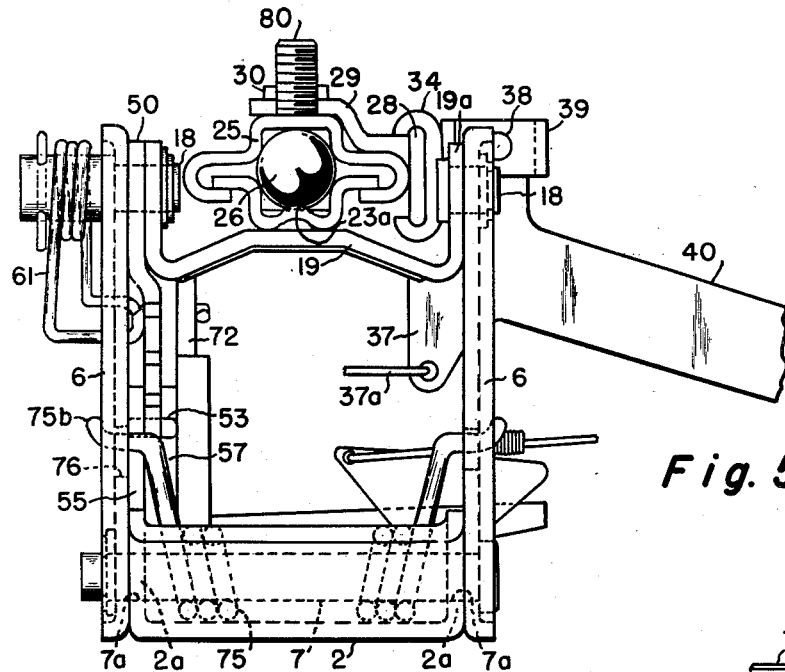
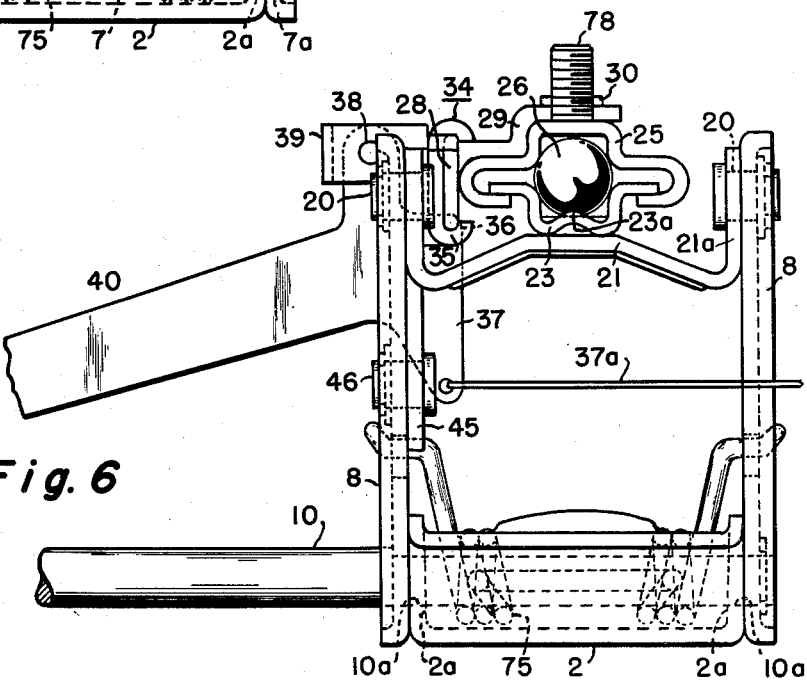

May 13, 1958 E. A. HERIDER ET AL 2,834,396
SEAT SUPPORT
Filed March 21, 1955 6 Sheets-Sheet 4

INVENTORS.
Elmer A. Herider
James Cumming
BY
THEIR ATTORNEYS

May 13, 1958  E. A. HERIDER ET AL  2,834,396
SEAT SUPPORT
Filed March 21, 1955  6 Sheets-Sheet 5
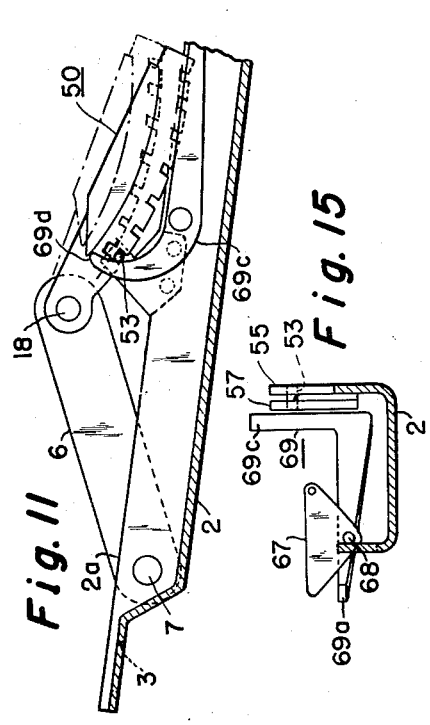
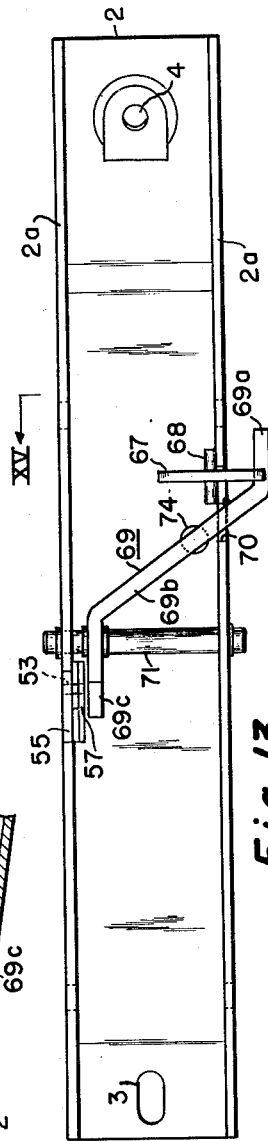
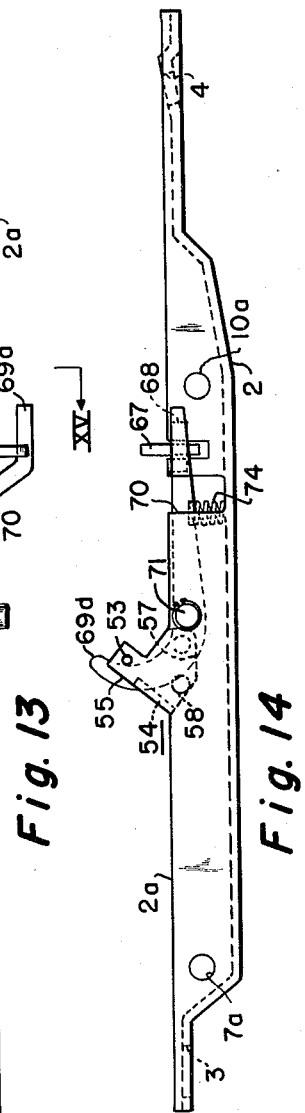
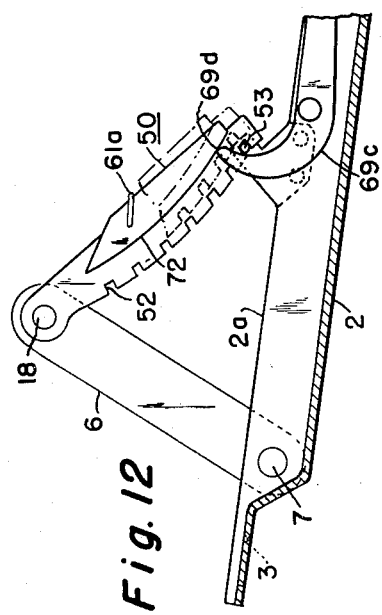
INVENTORS.
Elmer A. Herider
James Cumming
BY
THEIR ATTORNEYS May 13, 1958 E. A. HERIDER ET AL 2,834,396
SEAT SUPPORT Filed March 21, 1955 6 Sheets-Sheet 6

INVENTORS.
Elmer A. Herider
James Cumming
BY
Webb, Mackey & Burden
THEIR ATTORNEYS

United States Patent Office 2,834,396
Patented May 13, 1958

2,834,396

SEAT SUPPORT

Elmer A. Herider, Dearborn Township, Wayne County, and James Cumming, Detroit, Mich., assignors to Rockwell Spring and Axle Company, Coraopolis, Pa., a corporation of Pennsylvania Application March 21, 1955, Serial No. 495,536

12 Claims. (Cl. 155—14)

This invention relates to a seat support adapted to move a seat mounted thereon fore and aft when operated in one manner and to move the seat upwardly and downwardly when operated in another manner.

In the accompanying drawings which illustrate a preferred embodiment of our invention, Figure 1 is a side elevation of the seat support;

Figure 2 is a diagrammatic side elevation of the seat support showing the seat support in lowered position in full lines and in raised position in dotted lines;

Figure 3 is a horizontal longitudinal section taken on the line III—III of Figure 1;

Figure 4 is a plan view of the support shown in Figure 1;

Figure 5 is an enlarged partial front elevation taken on the line V—V of Figure 1;

Figure 6 is an enlarged rear elevation taken on the line VI—VI of Figure 1;

Figure 11 is a side elevation and partial section illustrating the rack and cam for retaining the seat in and releasing it from adjusted vertical position, the rack being shown in full lines when engaged and in dot and dash lines when released, the seat being in lowered position;

Figure 12 is a view generally similar to Figure 11 but showing the positions of the rack and cam when the seat is raised;

Figure 13 is a plan view of the base and means for releasing the rack;

Figure 14 is a side elevation of the structure shown in Figure 13;

Figure 15 is a vertical section taken on the line XV—XV of Figure 13;

Figure 7:
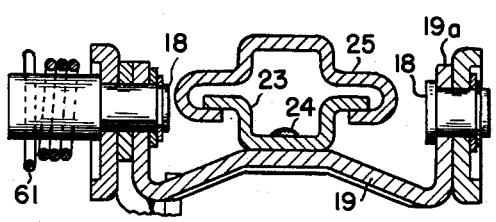
Figure 7 is a vertical section taken on the line VII—VII of Figure 4.

Referring more particularly to the accompanying drawings, the seat support comprises a base 2 provided at its front end with an opening 3 and at its rear end with an opening 4 for receiving a bolt used for securing the seat support to the floor of a vehicle. The lower end of each of a pair of front links 6 is secured to a shaft 7 mounted in holes 7a in the flanges 2a of the base 2. The lower end of each of a pair of rear links 8 is pivoted to the flange 2a of the base 2 by a crankshaft 10 extending transversely of the base 2 and mounted for rotation in holes 10a formed in the flanges 2a. The crankshaft has a flat portion 11 which cooperates with similarly shaped holes in the lower ends of the links 8, whereby rotation of the crankshaft causes the links 8 to rotate about the pivots 10 as a center. The crankshaft 10 has a pivot portion 10b and a crank portion 10c. The end of the crank portion 10c fits into a tube or sleeve 12 provided with a handle 13 adapted to be grasped by the operator. A pin 14 secured to the crank portion 10c fits into a slot 15 formed in the sleeve 12. Thus, the sleeve 12 can be rotated about its longitudinal axis to an extent limited by the pin 14 and slot 15 in order to actuate certain means hereinafter described for releasing a rack which normally engages a rack stop, the rack and rack stop when engaged, maintaining the seat in adjusted vertical position. The sleeve 12 and crank portion 10c can also be rotated as a unit about the pivot portion 10b as a center in order to rotate the pivot portion 10b about its longitudinal axis, thereby causing rotation of the rear supporting links 8.

Figure 8:
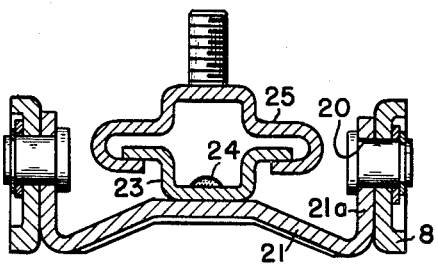
Figure 8 is a vertical section taken on the line VIII—VIII of Figure 1.

The upper end of each front supporting link 6 is pivotally connected by a rivet 18 to the flange 19a of a front bracket 19. The upper end of each rear supporting link 8 is pivotally connected by a rivet 20 to the flange 21a of a rear bracket 21. A lower seat track 23 is welded as indicated by reference numeral 24 in Figure 8 to the brackets 19 and 21. The links 6 and 8 are of the same length and the distance between their points of connection 7 and 10 to the base 2 and the distance between their points of connection 18 and 20 to the brackets 19 and 21 are the same. Thus, the links 6 and 8, the portions of the base 2 and the lower seat track 23 between the pivots of the links form a parallelogram.

Figure 9:
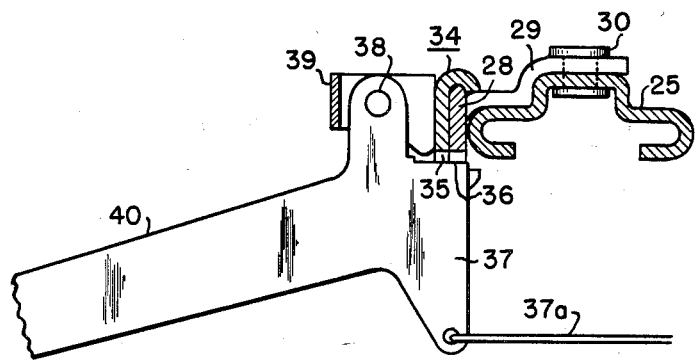
Figure 9 is a vertical section taken on the line IX—IX of Figure 1.
Figure 20:
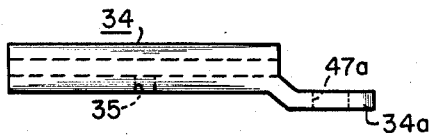
Figures 20, 21 and 22 are, respectively, a plan view, a side elevation and an end elevation of a crosshead.
Figure 21:
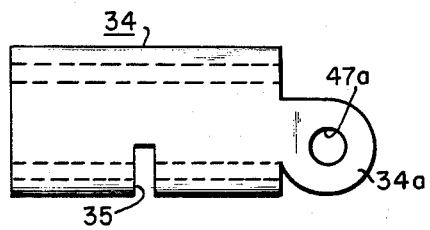
Figure 22:
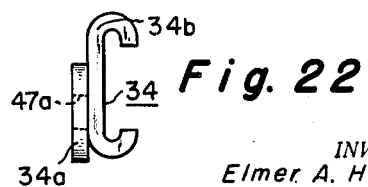

An upper seat track 25 is supported from the lower seat track 23 on ball bearings 26. The lower seat track is provided with two spaced apart humps 23a which confine the balls between the upper and lower seat tracks. A rack designated generally by reference numeral 28 is secured to the upper track by spaced lugs 29 and rivets 30. The rack 28 has teeth 32 formed on its lower edge. A crosshead indicated generally by reference numeral 34 and shown more particularly in Figures 20–22 is slidably supported on the rack 28. The crosshead is generally C-shaped in cross section as shown in Figure 22 with its curved portions embracing the top and bottom edges of the rack 28. The crosshead 34 has a slot 35 formed in its lower edge which receives a portion 36 of a latch 37. The latch is carried by and pivotally connected to the crosshead 34 by means of a pin 38 received in openings in a saddle bracket 39 which is welded to the crosshead. The portion 36 of the latch extends into an opening between the teeth on the rack so that when the parts are in the positions shown in Figure 9 the latch 37 locks the crosshead 34 to the rack 28 and thereby in effect locks the crosshead to the upper seat track 25. The latch 37 has a downwardly and outwardly extending arm portion 40 and an upwardly extending portion 41 terminating in a finger grip 42 located within convenient reach of the operator of the vehicle. A tension wire 37a urges the latch in a direction to normally lock the crosshead and upper seat track 25 together. These parts may be unlocked by raising the finger grip portion 42, thereby disengaging the portion 36 of latch 37 from the rack 28.

A stabilizing link 45 is pivotally connected at 46 to one of the rear supporting links 8. The other end of stabilizing link 45 is pivotally connected by a pin 47 to the crosshead 34, the pin 47 being received in a hole 47a formed in a lug portion 34a which is integral with the C-shaped portion 34b of the crosshead.

Figure 17:
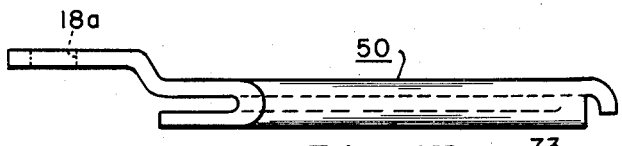
Figures 17, 18 and 19 are, respectively, a plan view, a side elevation and an end elevation of a rack.
Figure 18:
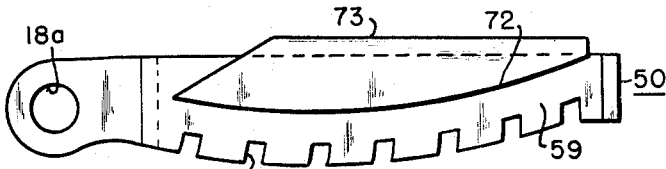
Figure 19:
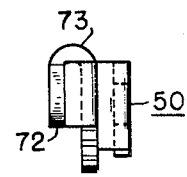

A rack indicated generally by reference numeral 50 and shown in detail in Figures 17–19 is pivotally mounted at its upper end to the front bracket 19 by means of the rivet 18 received in an opening 18a provided in one end of the rack. The rack has spaced slots 52 for receiving a locking pin 53 mounted on a rack stop indicated generally by reference numeral 54. The pin 53 extends between an upward projection 55 formed integrally with an upstanding flange 2a on the base 2 and an upstanding lug 57 secured to the base 2 by rivets 58. The lug 57 is spaced from the upstanding portion 55 sufficiently to form a guide slot between the parts 55 and 57 for receiving and guiding the portion 59 of the rack in which the slots 52 are formed. When the seat has been adjusted vertically to any desired height, one of the slots 52 in the rack fits over the rack stop pin 53. The rack is urged into engagement with the pin 53 by means of a spring 61 coiled about the rivet 18 and having one end 61a fitting over and pressing downwardly on the rack and having its other end 61b hooked and received in an opening 61c in one of the front supporting links 6.

Figure 10:
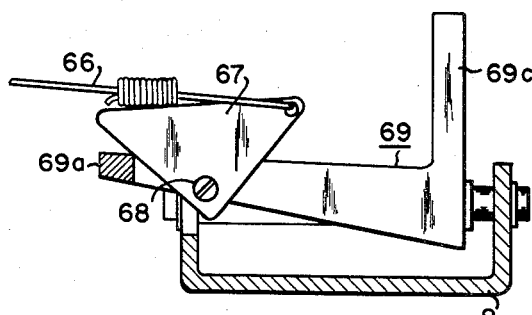
Figure 10 is a vertical section taken on the line X—X of Figure 3.
Figure 16:
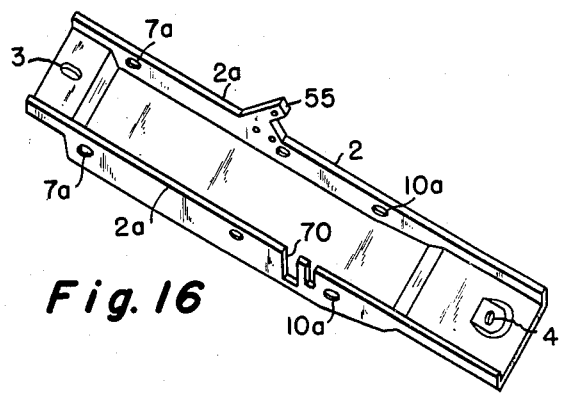
Figure 16 is a perspective view of the base.

Means as follows is provided for releasing the rack 50 from the pin 53. The tube or sleeve 12 adjacent its inner end has an integral arm 64 provided with an opening 65. A wire 66 is connected at one end to the arm 64 and at its other end to a bell crank lever 67 (Figs. 10 and 13). The bell crank lever is pivotally mounted on a pin 68 which is welded to the base 2. The bell crank lever 67 operates a rocker arm indicated generally by reference numeral 69. The rear end 69a of the rocker arm is contacted by the bell crank lever 67. The rocker arm has a portion 69b which extends inwardly and forwardly through a slot 70 in the flange of base 2 and the rocker arm is pivotally mounted on a shaft 71 secured in the base 2. The forward end 69c of the rocker arm is curved and its end 69d is adapted to contact a cam portion 72 of the rack 50. The cam portion 72 is formed at the lower edge of a rolled over portion 73 of the rack 50. When the end 69d of the rocker arm is raised, it raises the rack 50 from the pin 53, thereby allowing the seat support to be raised. A compression spring 74 presses upwardly on portion 69a of rocker arm 69 to normally maintain end 69d out of contact with rack 50.

A spring 75 is coiled about the shaft 7 with one portion 75a of the spring pressing against the base 2 and the other end 75b passed through openings 76 in the supporting links 6. A similar spring 75 is coiled about the crankshaft 10 and connected to the links 8. The two springs 75 exert most of the force required to rotate the links 6 and 8 in order to raise the seat. The seat, not shown, is supported on the upper seat track 25 by a rear bracket 77 secured to a rear stud 78 on the upper seat track 25 and by a front bracket 79 secured to a front stud 80 mounted on the front end of the upper seat track.

The operation of the seat support to raise and lower a seat is as follows. The operator grasps the handle 13 and rotates the sleeve 12 in a clockwise direction about its longitudinal axis. During this rotation, the sleeve 12 merely rotates on the crank portion 10c but does not in any manner move the crank portion. Rotation of the sleeve 12 is transmitted through the arm 64, wire 66, bell crank 67 and rocker arm 69 in order to raise the free end 69d of the rocker arm, thereby lifting the rack 50 from the stop pin 53. Then the handle 13 is pressed downwardly, thereby rotating the crankshaft 10 in a counterclockwise direction as viewed in Figure 1. Because of the flat surface 11 on the crankshaft 10, the links 8 are caused to rotate counterclockwise about the crankshaft 10 as a pivot. Likewise, the front supporting links 6 are rotated in a counterclockwise direction due to the parallelogram arrangement previously described. Referring more particularly to Figure 2, as the supporting links 6 and 8 move from the full to the dotted line position, the lower seat track 23 slides to the left relative to the crosshead 34 and since the crosshead and upper seat track 25 are locked together by the latch 37, the lower seat rack slides relative to the upper seat track 25. In this movement of the supporting links 6 and 8 from the full line to the dotted line position, the upper seat track 25 moves upwardly but does not move in a fore-and-aft direction with respect to the base 2. The movement of the upper seat track 25 is purely in a vertical direction. After the upper seat track has been adjusted to the desired vertical height, the handle 13 is released, whereupon spring 74 releases end 69d of the rocker arm 69 from the rack 50 and the rack engages the rack stop pin 53 to retain the seat support in adjusted vertical position. Lowering of the seat can be accomplished by rotating the handle 13 to actuate rocker arm 69 and release the rack 50 from the rack stop pin 53 and allowing the handle and tube 12 to rise under the influence of the weight of the passenger. The handle is then released and spring 74 acts in the manner described to allow the rack to engage the rack stop pin. It is to be noted that during the vertical movement of the seat as just described, the latch 37 is in such position as to lock the upper seat track 25 to the crosshead 34. Because the crosshead is connected by the stabilizing link 45 to one of the supporting links 8, the crosshead is prevented from moving in a fore-and-aft direction during raising or lowering of the seat as just described.

When it is desired to move the upper seat track 25 for or aft, the finger grip portion of the arm 40 is raised, thereby disengaging the latch 37 from the rack 28 secured to the upper seat track 25. This allows the upper seat track 25 to be slid forwardly or rearwardly relative to the crosshead 34 and lower seat track 23, after which the finger grip portion is released and tension wire 37a causes latch 37 to lock the upper track to the crosshead.

The invention is not limited to the preferred embodiment but may be otherwise embodied or practiced within the scope of the following claims.

We claim:
1. A seat support adapted to move a seat mounted thereon fore and aft and upwardly and downwardly, which comprises a base, a pair of supporting links adjacent the front end of said base and a pair of supporting links adjacent the rear end of said base, each of said links being pivoted adjacent its lower end to said base and having its upper end extending above said base, a lower seat track located above said base and pivotally supported by said supporting links, said links and the portions of said base and said lower seat track between said links forming a parallelogram, an upper seat track slidably supported on said lower seat track, a crosshead having a slide connection to said upper seat track, means for locking said upper seat track to said crosshead, a stabilizing link pivoted adjacent one end directly to an intermediate portion of one of said supporting links and pivoted adjacent its other end to said crosshead to constrain the same to freedom of movement substantially in the up and down direction only, means for rotating said supporting links about their pivots to the base to raise and lower said lower seat track, and means for locking said lower seat track in and releasing it from adjusted vertical position.

2. A seat support adapted to move a seat mounted thereon fore and aft and upwardly and downwardly, which comprises a base, a pair of supporting links adjacent the front end of said base and a pair of supporting links adjacent the rear end of said base, each of said links being pivoted adjacent its lower end to said base and having its upper end extending above said base, a lower seat track located above said base and pivotally supported by said supporting links, said links and the portions of said base and said lower seat track between said links forming a parallelogram, an upper seat track slidably supported on said lower seat track, a crosshead having a slide connection to said upper seat track, means for locking said upper seat track to said crosshead, a stabilizing link pivoted adjacent one end to one of said supporting links and pivoted adjacent its other end to said crosshead, an individual engageable part secured to each of, and together forming a connection between said lower seat track and said base, said engageable parts comprising a rack and a cooperating rack stop which when engaged hold said lower seat track in an adjusted position relative to said base, biasing means to pivot said rack part into engagement with said rack stop part, a crankshaft connected to at least one of said supporting links and operable upon rotating of said crankshaft to rotate said supporting links about their pivots to said base to raise and lower said lower seat track, a sleeve rotatable on said crankshaft, said sleeve having a crank arm, and means operable upon rotating said sleeve on said crankshaft for disengaging said rack part from said rack stop part.

3. A seat support adapted to move a seat mounted thereon fore and aft and upwardly and downwardly, which comprises a base, a pair of supporting links adjacent the front end of said base and a pair of supporting links adjacent the rear end of said base, each of said links being pivoted adjacent its lower end to said base and having its upper end extending above said base, a lower seat track located above said base and pivotally supported by said supporting links, said links and the portions of said base and said lower seat track between said links forming a parallelogram, an upper seat track slidably supported on said lower seat track, a crosshead having a slide connection to said upper seat track, means for locking said upper seat track to said crosshead, a stabilizing link pivoted adjacent one end to one of said supporting links and pivoted adjacent its other end to said crosshead, an individual engageable part secured to each of, and, together forming a connection between said lower seat track and said base, said engageable parts comprising a rack and a cooperating rack stop which when engaged hold said lower seat track in an adjusted position relative to said base, biasing means to pivot said rack part into engagement with said rack stop part, a crank shaft connected to at least one of said supporting links and operable upon rotating of said crankshaft to rotate said supporting links about their pivots to said base to raise and lower said lower seat track, a sleeve rotatable on said crankshaft, said sleeve having a crank arm, a rocker arm for disengaging said rack part from said rack stop part, a bell crank lever for actuating said rocker arm, and means connecting said bell crank lever and said crank arm for actuating said bell crank lever upon rotating said sleeve on said crankshaft.

4. A seat support adapted to move a seat mounted thereon fore and aft and upwardly and downwardly, which comprises a base, a pair of supporting links adjacent the front end of said base and a pair of supporting links adjacent the rear end of said base, each of said links being pivoted adjacent its lower end to said base and having its upper end extending above said base, a lower seat track located above said base and pivotally supported by said supporting links, said links and the portions of said base and said lower seat track between said links forming a parallelogram, an upper seat track slidably supported on said lower seat track, a crosshead having a slide connection to said upper seat track, a rack fixed to said upper seat track, a latch carried by and pivoted to said crosshead and adapted to cooperate with said rack to lock said upper seat track to said crosshead, a stabilizing link pivoted adjacent one end to an intermediate portion of one of said supporting links and pivoted adjacent its other end to said crosshead to constrain the same to substantially up and down movement only, means for rotating said supporting links about their pivots to the base to raise and lower said lower seat track, and means for locking said lower seat track in and releasing it from adjusted vertical position.

5. A seat support adapted to move a seat mounted thereon fore and aft and upwardly and downwardly, which comprises a base, a pair of front supporting links and a pair of rear supporting links pivoted adjacent their lower ends to said base, a front bracket pivotally connected to the upper ends of said front supporting links, a rear bracket pivotally connected to the upper ends of said rear supporting links, a lower seat track extending between and fixed to said brackets, said links and the portions of said base and said lower seat track between said links forming a parallelogram, an upper seat track slidably supported on said lower seat track by anti-friction bearings, a crosshead having a slide connection to said upper seat track, means for locking said upper seat track to said crosshead, a stabilizing link connected to pivot at one end relative to an intermediate portion of one of said supporting links and connected to pivot at its other end relative to said crosshead to constrain the latter to approximately up and down motion only, means for rotating said supporting links about their pivots to the base to raise and lower said lower seat track, and means for locking said lower seat track in and releasing it from adjusted vertical position.

6. A seat support comprising the combination of slidably related upper and lower rails forming a support rail assembly, links depending therefrom connected at one end to spaced points on said lower rail in the assembly and at their other end to a base to form therewith a parallelogram linkage for swingably supporting the rail assembly, a crosshead having a slide connection to said upper seat rail and having a stabilizer link pivotally connected thereto and to an intermediate portion of one of said depending links to constrain the movement of the crosshead to substantially straight line motion up and down as the linkage swings the rail assembly, and locking means to hold the upper seat rail fast to the crosshead so as to allow only vertical movement of the crosshead and upper seat rail as the swingably supported lower rail moves relative to the base when swinging on the parallelogram linkage.

7. A seat support comprising the combination of a rail assembly having a swingably supported first rail, a seat connected rail mounted thereon having freedom of swinging movement conjointly with the first rail and having freedom of sliding movement relative thereto by means of an interposed connection, depending links connected at one end to spaced points on said first rail and at their other end to a base to form therewith a parallelogram linkage for swingably supporting said rail assembly, a crosshead slidably connected to said seat connected rail and having a stabilizer link pivotally connected thereto and to a point on one of said depending links substantially equidistant from the ends to constrain the movement of the crosshead to substantially straight line motion up and down as the linkage swings the rail assembly, and locking means to hold the seat connected rail fast to the crosshead so as to allow only vertical movement of the crosshead and seat connected rail as the swingably supported first rail moves relative to the base when swinging on the parallelogram linkage.

8. The seat support combination according to claim 7 wherein said interposed connection between said rails comprises anti-friction means for effecting the aforesaid sliding movement of the first rail relative to the seat connected rail, and release means connected to said locking means to release the said seat connected rail at will upon the same anti-friction means for its sliding movement relative to the swingably supported rail.

9. A seat support comprising the combination of a rail assembly having a swingably supported first rail, a seat connected rail mounted thereto having freedom of swinging movement conjointly with the first rail and having freedom of longitudinal movement relative thereto by means of an interposed connection, depending links connected at one end to spaced points on the first rail and at their other end to a base to form therewith a parallelogram linkage for swingably supporting said rail assembly, a crosshead slidably connected to said seat connected rail and having a stabilizer link pivotally connected thereto and to an intermediate portion on one of said depending links to constrain the movement of the crosshead to substantially straight line motion up and down as the linkage swings the rail assembly, locking means to hold the seat connected rail fast to the crosshead so as to allow only vertical movement of the crosshead and seat connected rail as the swingably supported first rail moves relative to the base when swinging on the parallelogram linkage, said interposed connection between said rails comprising captive ball elements to impart rolling action to effect the just said relative longitudinal movement, and release means connected to said locking means to release the seat connected rail at will for rolling movement relative to the first rail on the same captive ball elements.

10. The seat support combination according to claim 9 wherein the rails have closure means to retain the captive ball elements cooperatively in a common space included therebetween.

11. Support means for a seat structure comprising in combination, a base member, spaced bracket structure for supporting the seat structure above said base member, a pair of supporting link members pivoted respectively to the space bracket structure and to the base member to form therewith part of a parallelogram member mechanism of which the base constitutes the first or main member and the members of said pair constitute second and third members in front and rear positions respectively, a stabilizer link connected to one of said supporting link members, first and second members connected respectively to the stabilizer link and to the seat structure to form a slide member mechanism providing for fore and aft adjustment of the seat structure, a main supporting rail connected to span between said spaced bracket structure to complete said parallelogram member mechanism and slidably supporting the aforesaid member connected to said seat structure, and a rack connected to the second member of each of the aforesaid mechanisms and engageable with latching means on the first named member in each mechanism to lock the associated structure in adjusted position.

12. Support means for a seat structure comprising in combination a base member, spaced bracket structure for supporting the seat structure above said base member, a pair of supporting link members pivoted to the spaced bracket structure and to the base member at the rear and front to form therewith part of a parallelogram member mechanism of which the base constitutes the first or main member and the members of said pair constitute the second and third members, a stabilizer link connected to one of said supporting link members, first and second members, one connected to the stabilizer link and the other member connected to the seat structure to form a slide member mechanism providing for fore and aft adjustment of the seat structure, a main supporting rail connected to span across said spaced bracket structure so as to complete said parallelogram member mechanism and slidably supporting the aforesaid other member connected to said seat structure, a rack connected to the second member of each of the aforesaid mechanisms, and means connected to the first named member in each mechanism including a latch pin or plate engageable with the associated rack of each mechanism to hold the associated structure locked in adjusted positions.

References Cited in the file of this patent
UNITED STATES PATENTS

| | | |
|---|---|---|
| 544,821 | Morrison | Aug. 20, 1895 |
| 1,022,081 | Henderson | Apr. 2, 1912 |
| 2,076,309 | Whedon | Apr. 6, 1937 |
| 2,090,579 | Grinnell | Aug. 17, 1937 |
| 2,149,945 | Whedon | Mar. 7, 1939 |